(12) United States Patent
Toliyat et al.

(10) Patent No.: US 10,476,349 B2
(45) Date of Patent: Nov. 12, 2019

(54) METHOD AND APPARATUS FOR COMPACT AXIAL FLUX MAGNETICALLY GEARED MACHINES

(71) Applicant: The Texas A&M University System, College Station, TX (US)

(72) Inventors: Hamid A. Toliyat, College Station, TX (US); Matthew C. Johnson, Mesquite, TX (US); Matthew C. Gardner, Austin, TX (US)

(73) Assignee: The Texas A&M University System, College Station, TX (US)

( * ) Notice: Subject to any disclaimer, the term of this patent is extended or adjusted under 35 U.S.C. 154(b) by 375 days.

(21) Appl. No.: 15/287,493

(22) Filed: Oct. 6, 2016

(65) Prior Publication Data

US 2017/0104388 A1 Apr. 13, 2017

Related U.S. Application Data

(60) Provisional application No. 62/239,695, filed on Oct. 9, 2015.

(51) Int. Cl.
| | |
|---|---|
| *H02K 7/116* | (2006.01) |
| *H02K 15/02* | (2006.01) |
| *H02K 16/02* | (2006.01) |
| *H02K 7/11* | (2006.01) |
| *H02K 49/10* | (2006.01) |

(52) U.S. Cl.
CPC ............... *H02K 7/116* (2013.01); *H02K 7/11* (2013.01); *H02K 15/02* (2013.01); *H02K 16/02* (2013.01); *H02K 49/102* (2013.01)

(58) Field of Classification Search
CPC .......... H02K 7/116; H02K 7/11; H02K 16/02; H02K 15/02; H02K 49/102

USPC ........................................................ 310/3, 83
See application file for complete search history.

(56) References Cited

U.S. PATENT DOCUMENTS

| | | | |
|---|---|---|---|
| 2013/0099501 A1 | 4/2013 | Focchi et al. | |
| 2016/0134180 A1* | 5/2016 | Tchervenkov | H02K 21/24 |
| | | | 310/156.37 |
| 2017/0005560 A1* | 1/2017 | Bird | H02K 49/102 |
| 2017/0104388 A1* | 4/2017 | Toliyat | H02K 7/116 |
| 2017/0110956 A1* | 4/2017 | Morris | H02K 49/102 |

FOREIGN PATENT DOCUMENTS

| | | | | |
|---|---|---|---|---|
| CN | 101976905 A | 2/2011 | | |
| DE | 102014210299 A1 * | 12/2015 | ........... | H02K 49/102 |
| WO | WO-2012014596 A1 * | 2/2012 | ........... | H02K 49/108 |
| WO | WO-2015/117231 A1 | 8/2015 | | |
| WO | WO-2016104919 A1 * | 6/2016 | ........... | H02K 49/102 |

OTHER PUBLICATIONS

Thomas, Shane, "International Search Report", prepared for PCT/US2016/055806, dated Jan. 9, 2017, 2 pages.

* cited by examiner

*Primary Examiner* — Forrest M Phillips
(74) *Attorney, Agent, or Firm* — Winstead PC

(57) ABSTRACT

An axial flux magnetic geared machine includes a high speed magnetic rotor and a low speed magnetic rotor maintained in a spaced relationship from the high speed magnetic rotor. A modulating structure is disposed between the high speed magnetic rotor and the low speed magnetic rotor. A stator is disposed in a radially central bore of one or more of the high speed magnetic rotor, the low speed magnetic rotor, and the modulating structure.

20 Claims, 7 Drawing Sheets

METHOD AND APPARATUS FOR COMPACT AXIAL FLUX MAGNETICALLY GEARED MACHINES

CROSS-REFERENCE TO RELATED APPLICATIONS

This application claims priority to, and incorporates by reference for any purpose, U.S. Provisional Patent Application No. 62/239,695, filed Oct. 9, 2015.

BACKGROUND

Field of the Invention

The present application relates generally to electrical machines including, but not limited to electrical motors and electrical generators and more particularly, but not by way of limitation to electrical machines that are co-axially arranged with a magnetic gear.

History of the Related Art

Electrical machines have been utilized for a variety of purposes. Typically, the cost of an electric machine is proportional to the torque with which it must interact. For applications requiring a large torque at a low speed there are two generally accepted options. First, a high speed, low torque machine could be utilized in conjunction with a mechanical gear. Second, a larger low speed, high torque direct-drive machine could be utilized. Mechanical gears are generally viewed as unattractive options as they require considerable maintenance, produce acoustic noise, and have a shorter useful life.

Magnetic gears have attracted considerable attention as a possible replacement for traditional, mechanical gears. Unlike mechanical gears, which rely on the physical interaction between teeth, magnetic gears create a gearing action through the modulated interaction between magnetic flux generated by two means of inducing magnetic flux with different pole pair counts. Magnetic gears exhibit generally contactless operation and, as such, facilitate reduced maintenance, improved reliability, decreased acoustic noise, and physical isolation between input and output shafts.

SUMMARY

The present application relates generally to electrical machines and more particularly, but not by way of limitation to electrical machines that are co-axially arranged with a magnetic gear. In one aspect, the present invention relates to an axial flux magnetically geared machine. The axial flux magnetically geared machine includes a high speed magnetic rotor. A low speed magnetic rotor is maintained in a spaced relationship from the high speed magnetic rotor. A modulating structure is disposed between the high speed magnetic rotor and the low speed magnetic rotor. A stator is disposed in a radially central bore of one or more of the high speed magnetic rotor, the low speed magnetic rotor, and the modulating structure.

In another aspect, the present invention relates to a method of forming an axial flux magnetically geared machine. The method includes arranging a high-speed rotor in a spaced relationship from a low-speed rotor. A modulating structure is positioned between the high-speed rotor and the low-speed rotor. A stator is positioned in a radially central bore of one or more of the high speed magnetic rotor, the low speed magnetic rotor, and the modulating structure.

In another aspect, the present invention relates to an axial flux magnetically geared machine. The axial flux magnetically geared machine includes a high speed magnetic rotor. A low speed magnetic rotor is maintained in a spaced relationship from the high speed magnetic rotor. A modulating structure is disposed between the high speed magnetic rotor and the low speed magnetic rotor. The modulating structure includes a plurality of modulator segments. Each segment of the plurality of modulator segments includes a pair of oppositely-extending segments that extend laterally from opposed lateral sides of the modulator segment. A stator is disposed in a radially central bore of one or more of the high speed magnetic rotor, the low speed magnetic rotor, and the modulating structure.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1:
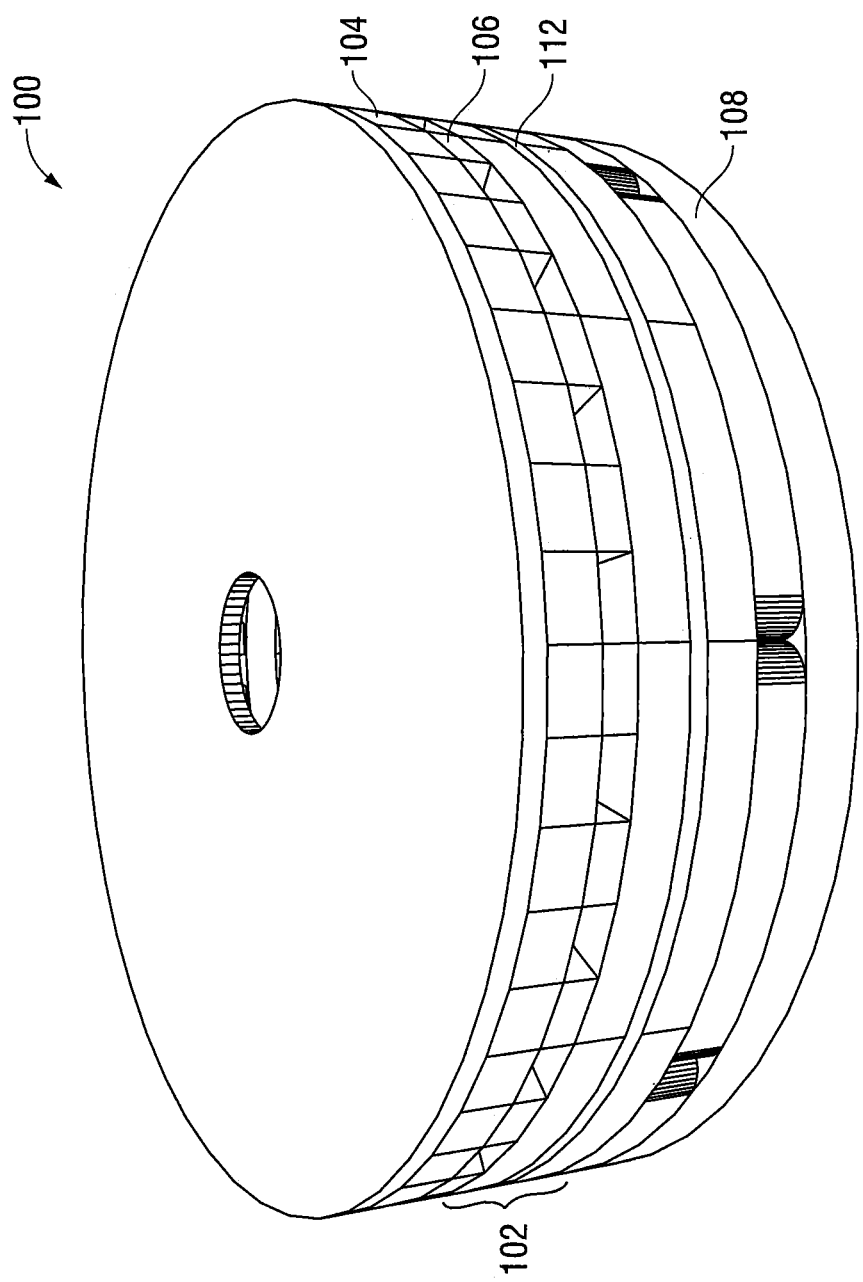
FIG. 1 is a perspective view of a series-connected axial flux magnetically geared machine.

FIG. 1 is a perspective view of a series-connected axial flux magnetically geared machine 100. Typical existing axial flux magnetically geared machines such as, for example, the magnetically geared machine 100, include a high speed rotor 102, a low speed rotor 104, and a modulating structure 106. The high speed rotor 102 typically includes a back iron 112 disposed between permanent magnets. A stator 108 disposed beyond the high speed rotor 102. Such an arrangement causes the stator 108 to increase the overall size of the machine 100.

Figure 2A:
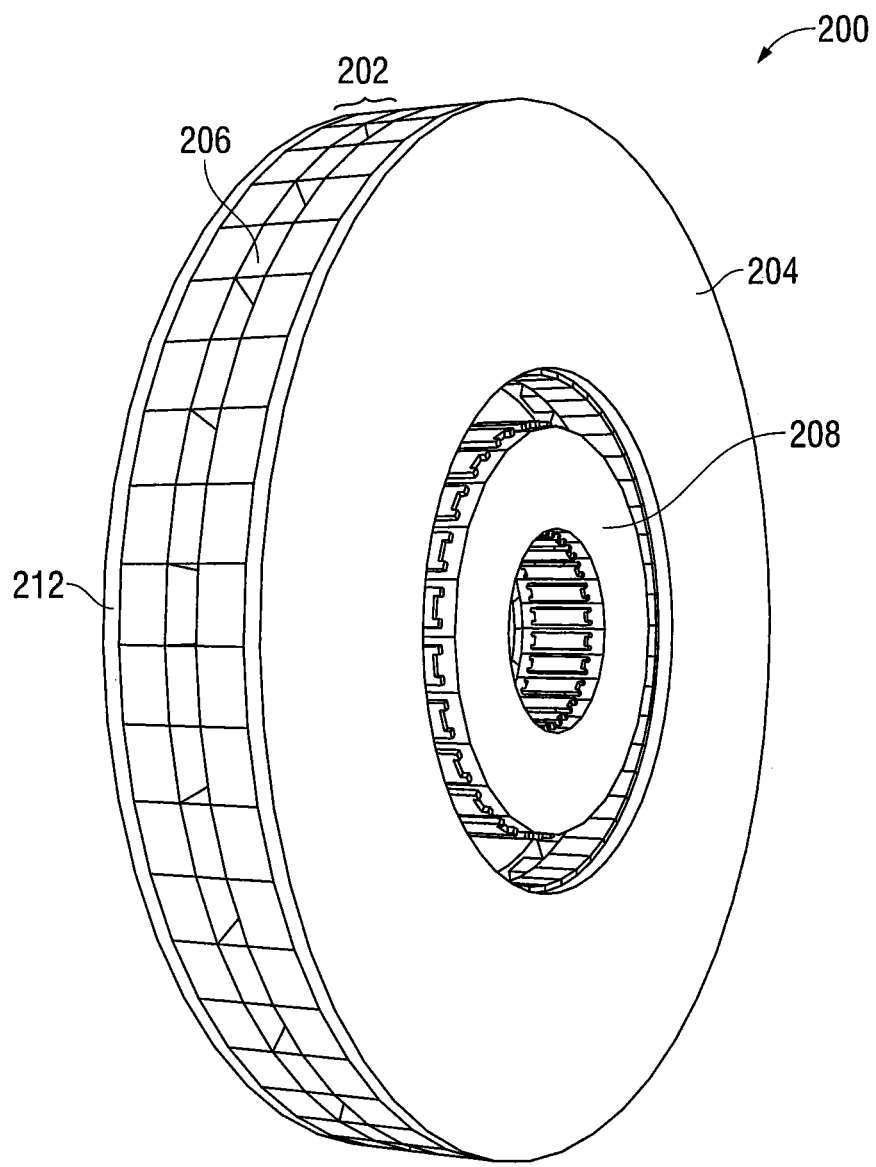
FIG. 2A is a perspective view of a compact axial flux magnetically geared machine according to an exemplary embodiment.
Figure 2B:
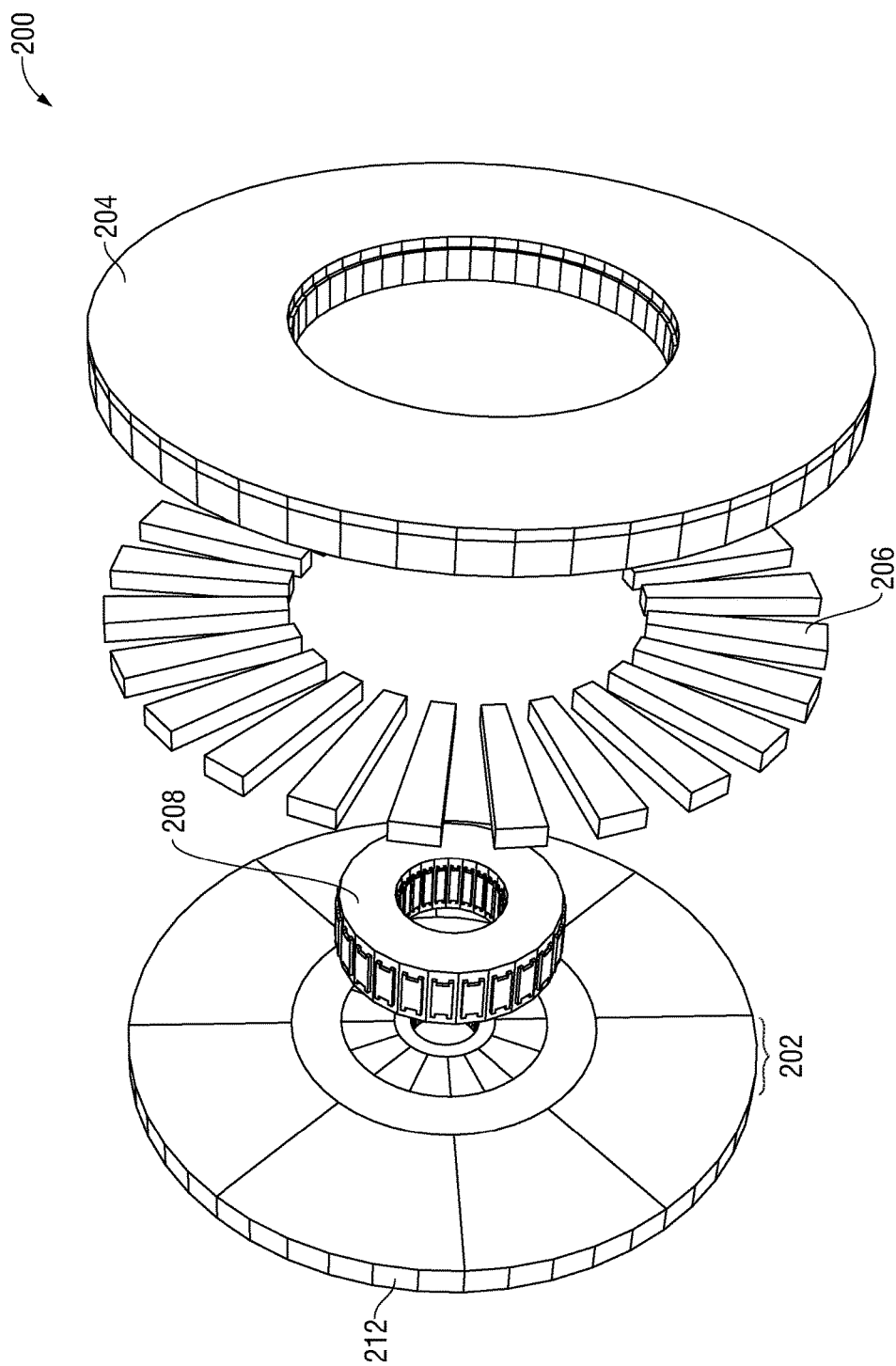
FIG. 2B is an exploded view of the compact axial flux magnetically geared machine of FIG. 2A.

FIG. 2A is a perspective view of a compact axial flux magnetically geared machine 200. FIG. 2B is an exploded view of the compact axial flux magnetically geared machine 200. Referring to FIGS. 2A and 2B collectively, the compact axial flux magnetically geared machine 200 includes a high speed rotor 202, a low speed rotor 204, and a modulating structure 206 positioned in a spaced relationship between the high speed rotor 202 and the low speed rotor 204. A back iron 212 comprises a portion of the high speed rotor 202. In a typical embodiment, the high speed rotor 202 and the low speed rotor 204 include a structure for inducing magnetic flux with a given pole pair count. For example, in various embodiments, the high speed rotor 202 includes a first permanent magnet having a first pole pair count and the low speed rotor 204 includes a second permanent magnet having a second pole pair count. In a typical embodiment, the first permanent magnet and the second permanent magnet include an array of magnets; however, in other embodiments, the first permanent magnet and the second permanent magnet may be singular. In various alternative embodiments, the high speed rotor 202 includes a first set of windings that carry an electrical current or the low speed rotor 204 includes a second set of windings that carry the electrical current. In various embodiments, a third permanent magnet array, or a set of windings that carry electrical current, may also be present on the high speed rotor 202 to induce magnetic flux with a third number of pole pairs, such that the high speed rotor 202 induces two sets of magnetic fluxes with pole pair counts that may be different from each other. One of the two sets of magnetic fluxes may, in various embodiments, interact with the modulating structure 206 and the low speed rotor 204 magnetic flux. The second of the two sets of magnetic fluxes interacts with the stator 208.

Still referring to FIG. 2A, the high speed rotor 202 and the low speed rotor 204, in a typical embodiment, include a disk of magnetically permeable steel with multiple permanent magnets attached to a surface of the magnetically permeable steel. Alternatively, the permanent magnets may be embedded within the magnetically permeable steel. In various alternative embodiments, the high speed rotor 202 and the low speed rotor 204 include a magnetically impermeable material having multiple permanent magnets attached to a surface of the magnetically impermeable material. In still other embodiments, the high speed rotor 202 and the low speed rotor 204 include alternating sections of permanent magnets and magnetically permeable steel. Magnetic flux induced by the high speed rotor 202 interacts with the modulating structure 206 and the magnetic flux induced by the low speed rotor 204. Magnetic flux induced by the high speed rotor 202 also interacts with a stator 208. The stator 208 is disposed in a radially central bore of one or more of the high speed rotor 202, the low speed rotor 204, and the modulating structure 206.

Still referring to FIGS. 2A and 2B, in a typical embodiment, the modulating structure 206 is constructed of any magnetically permeable material such as, for example, solid steel, electrical steel laminations, soft magnetic composites, or any other magnetically permeable material as dictated by design requirements. In a typical embodiment, the modulator segments of the modulating structure 206 are evenly spaced in a circular configuration. The width and length of the modulator segments as well as any modulator support structure may vary with design requirements. In various embodiments, the modulator segments may be separated by a magnetically impermeable material such as, for example, air, polyoxymethylene, fiberglass, or other magnetically-impermeable material as dictated by design requirements.

Still referring to FIGS. 2A and 2B, when the compact axial flux magnetically geared machine 200 is operated as a generator, an external motion source (not shown) rotates at least one of the low speed rotor 204 or the modulating structure 206. The magnetic flux of the low speed rotor 204 interacts with the magnetic flux of the high speed rotor 202 through the modulating structure 206 to produce rotation of the high speed rotor 202. Rotation of the high speed rotor 202 causes rotation of the magnetic flux of the high speed rotor 202. The magnetic flux of the high speed rotor 202 interacts with the stator 208, which produces electrical energy.

Still referring to FIGS. 2A and 2B, the modulating structure 206 modulates the magnetic field of the low speed rotor 204 to produce a magnetic field with a spatial frequency component that is the same as the magnetic field produced by the high speed rotor 202. Additionally, the modulating structure 206 modulates the magnetic field of the high speed rotor 202 to produce a magnetic field with a spatial frequency component that is the same as the magnetic field produced by the low speed rotor 204. This interaction between the magnetic field of the high speed rotor 202, the modulating structure 206, and the magnetic field of the low speed rotor 204 facilitates transmission of non-zero average torques between the high speed rotor 202 and the low speed rotor 204 or the modulating structure 206. The resulting steady state rotational speeds are determined by the pole pair count of the high speed rotor 202, the pole pair count of the low speed rotor 204, and the pole pair count of the modulating structure 206. This relationship is illustrated in Equation 1.

$$\omega_{HS} = \frac{-P_{LS}}{P_{HS}} \times \omega_{LS} + \frac{Q_M}{P_{HS}} \times \omega_M \qquad \text{Equation 1}$$

Where $P_{LS}$ is the pole pair count of the low speed rotor 204, $P_{HS}$ is the pole pair count of the magnetic flux of the high speed rotor 202 that interacts with the modulating structure 206 and the low speed rotor 204, $Q_M$ is the number of modulator pole pieces, $\omega_{HS}$ is the rotational velocity of the high speed rotor 202, $\omega_{LS}$ is the rotational velocity of the low speed rotor 204, and $\omega_M$ is the rotational velocity of the modulating structure 206. The pole piece count of the modulating structure 206 is determined by Equation 2.

$$Q_M = P_{LS} + P_{HS} \qquad \text{Equation 2:}$$

As indicated by Equation 1, there are multiple viable modes of operation, A few examples are given for clarification and it should not be construed that these examples limit the potential modes of operation. One example is to include a fixed modulating structure 206 and a rotatable low speed rotor 204 and high speed rotor 202. In this case, the gear ratio is determined by Equation 3.

$$G_r = \frac{-P_{LS}}{P_{HS}} \qquad \text{Equation 3}$$

In a second example, the low speed rotor 204 is fixed and the modulating structure 206 and the high speed rotor 202 rotate. In this case, the gear ratio is given by Equation 4.

$$G_r = \frac{Q_M}{P_{HS}} \qquad \text{Equation 4}$$

In various embodiments, the compact axial flux magnetically geared machine 200 could be driven in the inverse direction to operate as a motor. When operated as a motor, positive electrical energy flows into the compact axial flux magnetically geared machine 200 through terminals on the stator 208 and positive rotational energy flows out of the compact axial flux magnetically geared machine 200 through rotation of the low speed rotor 204 or rotation of the modulating structure 206.

Still referring to FIGS. 2A and 2B, placing the stator 208 inside the bore of the compact axial flux magnetically geared machine 200 prevents the increase in volume often associated with series connections as illustrated in FIG. 1 and makes use of empty space inside the axial flux magnetically geared machine 200 that was previously unused or poorly used. As a result of this feature, the total volume consumed by the axial flux magnetically geared machine 200 is reduced from the arrangement shown and described in FIG. 1. Furthermore, the compact topology of the axial flux magnetically geared machine 200 facilitates use of a smaller outer radius for the stator 208. Finally, the high speed rotor back iron 212 of the axial flux magnetically geared machine 200 may be constructed from thinner material than that utilized in FIG. 1 as the high speed rotor back iron 212 no longer must isolate magnetic flux from magnets located on both sides of the high speed rotor back iron 212. Reduction of a thickness of the high speed rotor back iron 212 results in consumption of less material thereby allowing less expensive construction of the compact axial flux magnetically geared machine 200.

Figure 3:
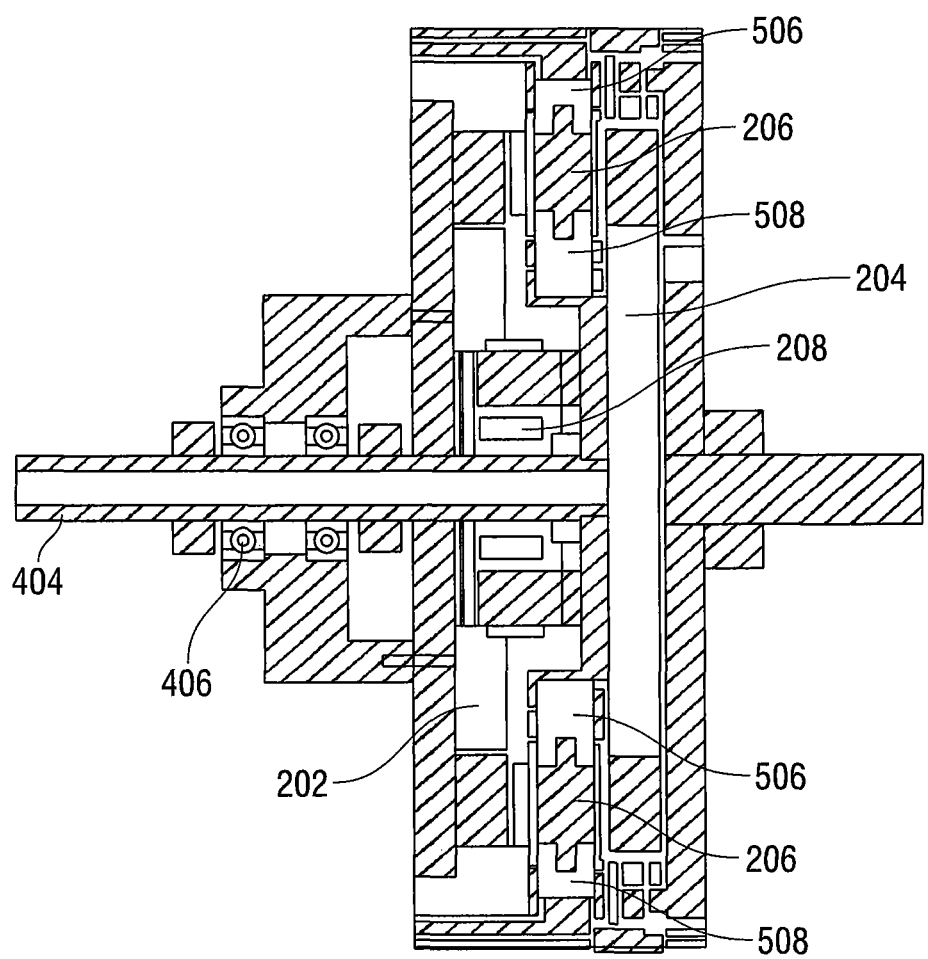
FIG. 3 is a cross-sectional view of a compact axial flux magnetically geared machine according to an exemplary embodiment.
Figure 4:
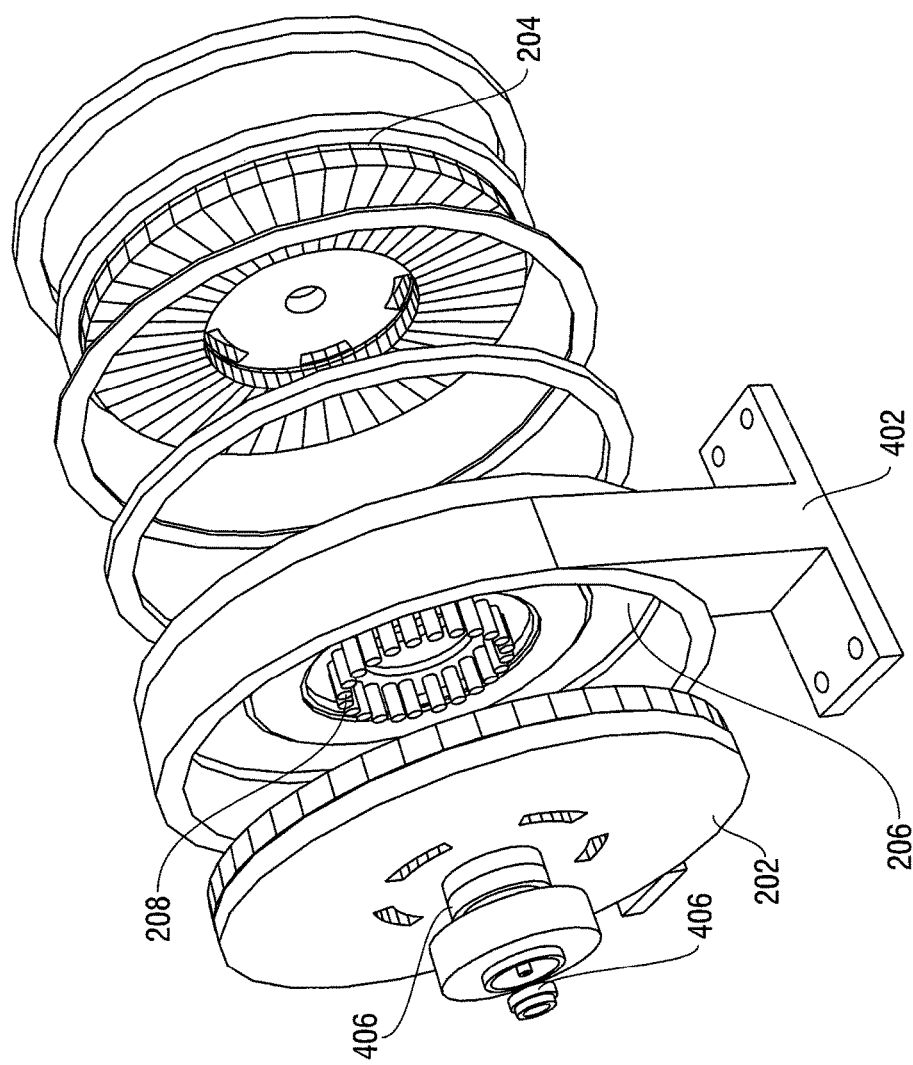
FIG. 4 is an exploded view of a compact axial flux magnetically geared machine according to an exemplary embodiment.

FIG. 3 is a cross-sectional view of a compact axial flux magnetically geared machine 200. FIG. 4 is an exploded view of a compact axial flux magnetically geared machine 200. Referring to FIGS. 3-4 together, the compact axial flux magnetically geared machine 200 includes a stationary sub-assembly 402. The stationary sub-assembly 402 includes the stator 208 and, in various embodiments, may also include the modulating structure 206 as dictated by design requirements. A support shaft 404 is positioned through the high speed rotor 202. In a typical embodiment, the support shaft 404 is stationary and rotation of the high speed rotor 202 is facilitated by bearings 406.

Figure 5:
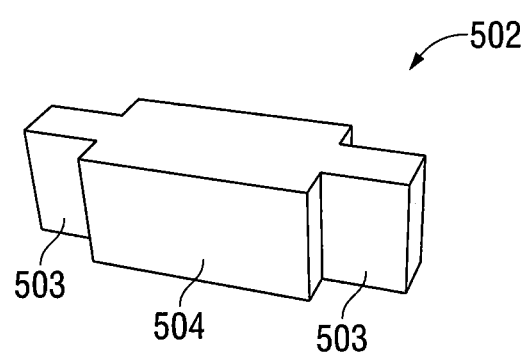
FIG. 5 is a perspective view of a modulator segment having stepped ends according to an exemplary embodiment.

FIG. 5 is a perspective view of a segment 502 having stepped ends of the modulating structure 206. In a typical embodiment, the modulating structure 206 comprises a plurality of the segments 502. The segment 502 includes a central area 504 and a pair of oppositely extending sections 503. The oppositely extending sections 503 extend radially from the central area 504 and are thinner than the central area 504. The increased thickness of the central area 504 imparts increased strength to the segment 502 and improves magnetic performance. During operation, the modulating structure 506 and the segments 502 are subjected to strong magnetic forces. Thus, the segments 502 must be supported by a structure capable of withstanding such forces. As shown in FIG. 5, the segments 502 are gripped by an inner retaining ring 506 (shown in FIG. 3) and an outer retaining ring 508 (shown in FIG. 3). The inner retaining ring 506 and the outer retaining ring 508 are clamped onto the oppositely extending sections 503. In various embodiments, the inner retaining ring 506 and the outer retaining ring 508 may be comprised of multiple rings.

Figure 6A:
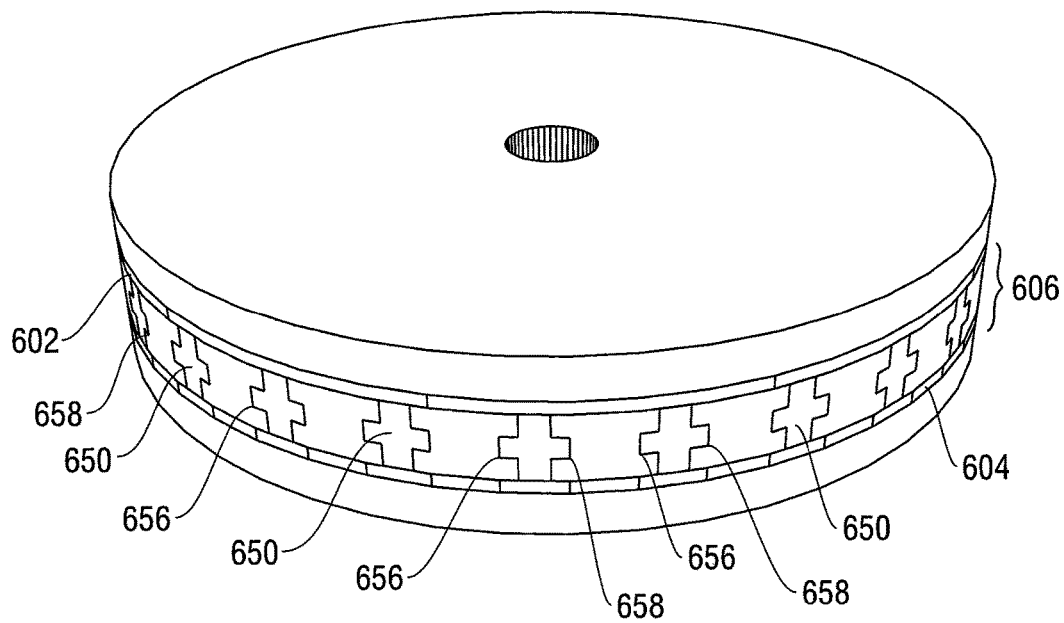
FIG. 6A is a perspective view of an axial flux magnetically geared machine utilizing interlocking modulator segments according to an exemplary embodiment.
Figure 6B:
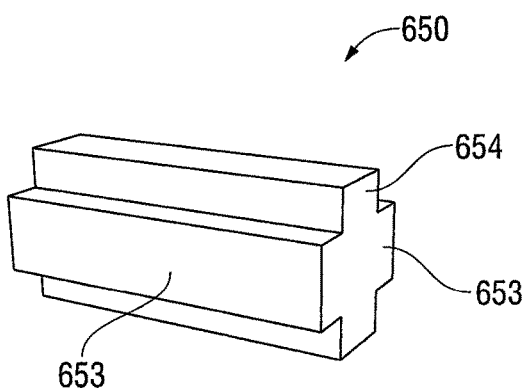
FIG. 6B is a perspective view of an interlocking modulator segment according to an exemplary embodiment.

FIG. 6A is a perspective view of an axial flux magnetically geared machine 600 utilizing interlocking modulator segments 650. FIG. 6B is a perspective view of the interlocking modulator segment 650. Referring to FIGS. 6A-6B collectively, the compact axial flux magnetically geared machine 600 includes a high speed rotor 602, a low speed rotor 604, and a modulating structure 606 positioned in a spaced relationship between the high speed rotor 602 and the low speed rotor 604. In a typical embodiment, the high speed rotor 602 and the low speed rotor 604 are similar in function and construction to the high speed rotor 202 and the low speed rotor 204 discussed above. The modulating structure 606 includes a plurality of interlocking modulator segments 650. Each segment of the plurality of interlocking modulator segments 650 includes a central area 654 and a pair of oppositely extending sections 653. The oppositely extending sections 653 extend laterally from the sides of the central area 654 and are thinner than the central area 654. In a typical embodiment, the oppositely extending sections 653 interlock with a non-magnetic support member 656 disposed between adjacent segments of the plurality of interlocking modulator segments 650. The non-magnetic support member 656 may be constructed from any magnetically impermeable material that has sufficient mechanical strength to support the modulator segments 650 against the magnetic forces produced during operation. In a typical embodiment, the non-magnetic support member 656 is constructed of an electrically non-conductive material so as to minimize losses produced in the non-magnetic support member 656 due to varying magnetic fields. In a typical embodiment, the non-magnetic support member 656 may be constructed of materials such as, for example, polyoxymethylene, fiberglass, various other polymers, or other magnetically impermeable materials as dictated by design requirements. The non-magnetic support member 656 includes oppositely disposed recesses 658. Each oppositely disposed recess 658 is sized to receive an oppositely extending section 653 of the pair of oppositely extending sections 653. In a typical embodiment, the non-magnetic support member 656 is constructed via, for example, over molding or other appropriate process. Such an arrangement provides structural and electromagnetic advantages. For example, the axial flux magnetically geared machine 600 offers reduced magnetic flux leakage.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. An axial flux magnetically geared machine, comprising:
    a high speed magnetic rotor;
    a low speed magnetic rotor maintained in a spaced relationship from the high speed magnetic rotor;
    a modulating structure disposed between the high speed magnetic rotor and the low speed magnetic rotor, so as to modulate a magnetic field of at least one of the high speed magnetic rotor and the low speed magnetic rotor; and
    a stator disposed in a radial central bore of the modulating structure and at least one of the high speed magnetic rotor and the low speed magnetic rotor.

2. The axial flux magnetically geared machine of claim 1, wherein the stator functions as an electric generator.

3. The axial flux magnetically geared machine of claim 1, wherein the stator functions as an electric motor.

4. The axial flux magnetically geared machine of claim 1, wherein the modulating structure rotates in addition to, or in place of, the low speed magnetic rotor.

5. The axial flux magnetically geared machine of claim 4, wherein the stator functions as an electric generator.

6. The axial flux magnetically geared machine of claim 4, wherein the stator functions as an electric motor.

7. The axial flux magnetically geared machine of claim 1, wherein the modulating structure comprises a plurality of segments.

8. The axial flux magnetically geared machine of claim 7, wherein each segment of the plurality of segments comprise a pair of oppositely-extending segments that extend radially from a central area of the plurality of segments.

9. The axial flux magnetically geared machine of claim 8, wherein the plurality of segments are secured by a retaining ring.

10. The axial flux magnetically geared machine of claim 7, wherein each segment of the plurality of segments comprises a pair of oppositely-extending segments that extend laterally from opposed lateral sides of the segment.

11. The axial flux magnetically geared machine of claim 10, wherein the plurality of segments interlock with a non-magnetic support member that is disposed between adjacent segments of the plurality of segments.

12. The axial flux magnetically geared machine of claim 11, wherein a portion of each segment of the plurality of segments is received into a recess formed in the non-magnetic support member.

13. A method of forming an axial flux magnetically geared machine, the method comprising:
arranging a high-speed magnetic rotor in a spaced relationship from a low-speed magnetic rotor;
positioning a modulating structure between the high-speed magnetic rotor and the low-speed magnetic rotor, so as to modulate a magnetic field of at least one of the high-speed magnetic rotor and the low-speed magnetic rotor; and
positioning a stator in a radial central bore of the modulating structure and at least one of the high speed magnetic rotor and the low speed magnetic rotor.

14. The method of claim 13, wherein the positioning the modulating structure comprises securing a plurality of modulator segments with each modulator segment of the plurality of modulator segments being in a spaced relationship from an adjacent modulator segment.

15. The method of claim 14, wherein the securing comprises securing the plurality of modulator segments with a retaining ring.

16. The method of claim 14, wherein the securing comprises securing the plurality of modulator segments with a non-magnetic support member.

17. The method of claim 16, wherein the securing comprises receiving a portion of the modulator segment into a recess formed in the non-magnetic support member.

18. An axial flux magnetically geared machine, comprising:
a high speed magnetic rotor;
a low speed magnetic rotor maintained in a spaced relationship from the high speed magnetic rotor;
a modulating structure disposed between the high speed magnetic rotor and the low speed magnetic rotor, the modulating structure comprising a plurality of modulator segments each segment of the plurality of modulator segments comprises a pair of oppositely-extending segments that extend laterally from opposed lateral sides of the modulator segment, so as to modulate a magnetic field of at least one of the high speed magnetic rotor and the low speed magnetic rotor; and
a stator disposed in a radial central bore of the modulating structure and at least one of the high speed magnetic rotor and the low speed magnetic rotor.

19. The axial flux magnetically geared machine of claim 18, wherein the plurality of modulator segments interlock with a non-magnetic support member that is disposed between adjacent segments of the plurality of segments.

20. The axial flux magnetically geared machine of claim 19, wherein a portion of each segment of the plurality of modulator segments is received into a recess formed in the non-magnetic support member.

* * * * *